F. & V. J. ROBERTS.
HOSE COUPLING FOR AIR BRAKES.
APPLICATION FILED OCT. 24, 1910.

985,551.

Patented Feb. 28, 1911.
2 SHEETS—SHEET 1.

Witnesses:
C. A. Brown
M. C. Bender

Inventors:
Francis Roberts
Vernon J. Roberts
by Foster Freeman Watson & Coit
Attys.

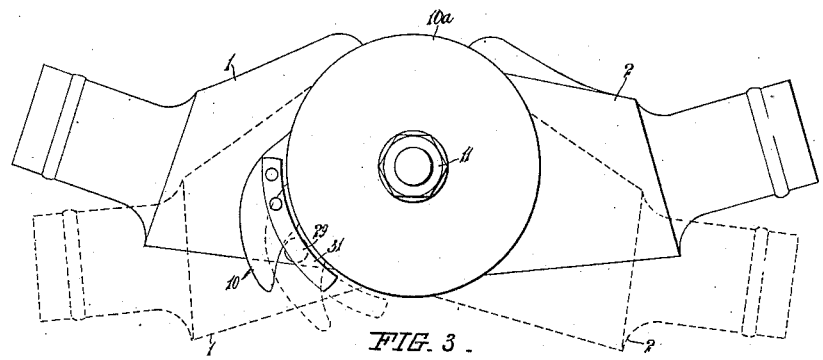

UNITED STATES PATENT OFFICE.

FRANCIS ROBERTS AND VERNON JOHN ROBERTS, OF AUCKLAND, NEW ZEALAND.

HOSE-COUPLING FOR AIR-BRAKES.

985,551.  Specification of Letters Patent.  Patented Feb. 28, 1911.

Application filed October 24, 1910. Serial No. 588,687.

*To all whom it may concern:*

Be it known that we, FRANCIS ROBERTS and VERNON JOHN ROBERTS, both citizens of the Dominion of New Zealand, residing at Kimberley Road, Epsom, Auckland, in the Provincial District of Auckland, New Zealand, and Melford street, Ponsonby, Auckland, aforesaid, respectively, have invented certain new and useful Improvements in Hose-Couplings for Air-Brakes, of which the following is a specification.

Our invention relates to improvements in hose couplings of air brakes; and the objects of our improvements are to provide a plug in each coupling which when fully coupled has a port in the plug brought into communication with air ports of a cylinder, whereby air passes from the train pipe to the cylinder and a piston therein is operated to allow air to flow from the train pipe through both hoses and their couplings. The disengaging of the couplings by hand, or their separation by being dragged apart, leaves the couplings open, allows air to escape from the train pipe and thereby actuate the brakes throughout. These objects are attained by mechanism illustrated in the accompanying drawings in which:—

Figure 1:
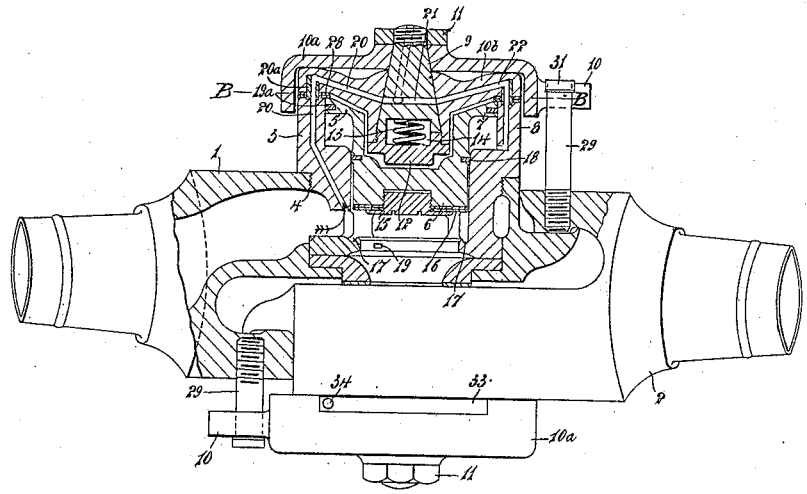
Figure 2:
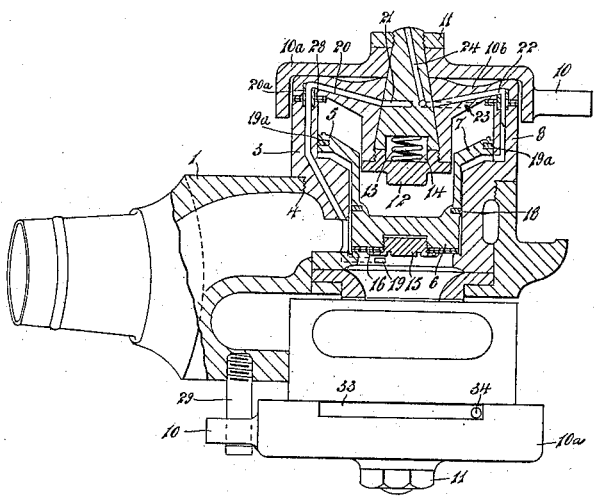

Figure 1 is a plan partly in section showing the hose couplings connected together. Fig. 2, another plan partly in section showing the couplings ready for connecting, Fig. 3, a side elevation of two couplings embodying the invention, Fig. 4, a part sectional plan on line A—A, Fig. 5. Figs. 5, 6, 7 and 8 are sectional plans on line B—B, Fig. 1, and showing the plug in different positions.

The couplings 1 and 2 are those commonly used upon Westinghouse brake pipes. A cylinder 3 screws into each coupling at 4, and is provided with a piston 5 having a trunk 6 and head 7, the said head working in an enlargement 8 of the cylinder. A plug 9 fitting a corresponding hole in the upper end of the cylinder is adapted to be turned by a handle 10, and is secured in position by a nut 11. The handle is formed into a cap $10^a$ to protect the head $10^b$ of the cylinder. A cap 12 screws into the cylinder head, and a spring 13 in compression within a recess 14 formed in the base of the plug and in the cap 12 tends to keep the plug in its seat. A screw cap 15 secures washers 16 forming a valve face in position upon the lower end of the trunk 6, and this valve face, when the couplings are closed as shown in Fig. 2, rests upon a seat 17 at the bottom of the cylinder. Expansion rings 18 and $19^a$ make joints between the piston 5 and the cylinder 3, and a ring or gasket $20^a$ makes a joint between the said cylinder and its head $10^b$.

When the couplings 1 and 2 are connected as shown in Figs. 1, 4, and 5 air flows from the hose of the head 1 in the direction shown by the arrow through an air port 20 formed in the side and head of the cylinder 3, through a port 21 traversing the plug 9, see Fig. 5, and through a port 22 formed in the other side of the head $10^b$ and of the cylinder 3 to the underside of the head 7 of the piston. The air also passes from the port 20 to a port 19, see Figs. 4 and 5, to the underside of the trunk 6, the piston being thereby forced outward and lifted from its seat 17 allowing free passage of air through the couplings and the train pipe. Communication to the atmosphere from the other side of the piston is provided through ports 23 and 24, see Figs. 2 and 5. When the piston 5 is open, the head 7 seats itself upon the ring 28, which projects into the cylinder for that purpose. At this time the plug is in such a position relatively to the cylinder that the ports are open, as shown in Figs. 1, 4 and 5.

In Fig. 6, the plug is shown in the position it occupies to close all the ports.

In Fig. 7 the position of the plug allows air to flow through the ports 20, 21 and 23, see Fig. 2, to the space between the head $10^b$ of the cylinder and the head 7 of the piston. At the same time air is allowed to escape from the other side of the head 7 to the atmosphere through the ports 22 and 24, see Figs. 2 and 7. The piston will then close upon its seat 17 under the air pressure thus preventing the passage of air through the couplings.

When the members of the coupling are being properly, manually disengaged the plugs will be turned first into the position shown in Fig. 7 to effect a closing of the pistons upon the seats 17, and then by a slight further rotation into the position shown in Fig. 8, in which the exhaust ports 22 are closed so that the pressure of air in each train pipe section will maintain the piston in its closed position, as shown in Fig. 2.

When coupling the heads, which is effected by turning them from the dotted line position shown in Fig. 3 to the position represented in full lines in said figure, a pin 29 upon each head engages with the handle 10 of the plug in the other head and turns said plug into the position shown in Figs. 1 and 5, thus causing the air pressure to move the pistons outward and establishing communication between the two sections of the train pipe. A spring catch 31 connected with each handle 10 engages the operating pin 29 to hold the handle against movement until manually released from said catch. In case the couplings are improperly disconnected, as by being pulled apart by the separation of the cars, the plugs 9 will be retained in the position shown in Figs. 1 and 5, and therefore air allowed to escape from the train pipe and apply the brakes.

The cap 10a has a recess 33 in its rim and a pin 34 projecting radially into the said recess, prevents the cap from exceeding the limits of its required maximum rotation in each direction.

What we do claim and desire to secure by Letters Patent of the United States is:—

1. The herein described air brake pipe coupling comprising two heads each including a lateral cylindrical extension, a piston reciprocable in said extension and adapted to close the air passage through the head, a rotatable plug mounted in each head and provided with ports adapted respectively to connect spaces on opposite sides of the piston with the pressure side of the air passage in the head and with the atmosphere, and means for automatically rotating said plug as the heads are coupled to render said ports therein operative.

2. The herein described air brake pipe coupling comprising two heads each including a lateral cylindrical extension, a piston reciprocable in said extension and adapted to close the air passage through the head, a rotatable plug mounted in each head in alinement with the piston and provided with ports adapted respectively to connect spaces on opposite sides of the piston with the pressure side of the air passage in the head and with the atmosphere, a handle for rotating the plug to close said ports, and means for automatically actuating the handle to rotate the plug and rendered said ports therein operative as the heads are coupled.

3. The herein described air brake pipe air coupling comprising two heads each including a lateral cylindrical extension, a piston reciprocable in said extension and adapted to close the air passage through the heads, a rotatable plug mounted in each head and provided with ports adapted respectively to connect spaces on opposite sides of the piston with the pressure side of the air passage in the head and with the atmosphere, a handle for rotating the plug to close said port, a pin on each head adapted to actuate the handle on the other to rotate the plug and render said ports operative as the heads are coupled, and means for locking said pin and handle together.

In testimony whereof we have affixed our signatures in presence of two witnesses.

FRANCIS ROBERTS.
VERNON JOHN ROBERTS.

Witnesses:
A. L. FERNEYHOUGH,
J. W. JONES.

---

Copies of this patent may be obtained for five cents each, by addressing the "Commissioner of Patents, Washington, D. C."